United States Patent
Lyman et al.

(10) Patent No.: US 10,032,159 B2
(45) Date of Patent: Jul. 24, 2018

(54) SPENDING DELEGATION

(71) Applicant: PAYPAL, INC., San Jose, CA (US)

(72) Inventors: Nathan Lyman, Livermore, CA (US); Roy Leon Camp, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 752 days.

(21) Appl. No.: 14/036,292

(22) Filed: Sep. 25, 2013

(65) Prior Publication Data

US 2015/0088741 A1    Mar. 26, 2015

(51) Int. Cl.
G06Q 40/00 (2012.01)
G06Q 20/34 (2012.01)
G06Q 20/40 (2012.01)
G06Q 20/02 (2012.01)
G06Q 20/32 (2012.01)

(52) U.S. Cl.
CPC ....... G06Q 20/35785 (2013.01); G06Q 20/02 (2013.01); G06Q 20/322 (2013.01); G06Q 20/40 (2013.01)

(58) Field of Classification Search
CPC .... G06Q 20/04; G06Q 20/227; G06Q 20/403; G06Q 20/405; G07F 7/08

USPC ......................................................... 705/65
See application file for complete search history.

(56) References Cited

U.S. PATENT DOCUMENTS

| | | | | |
|---|---|---|---|---|
| 5,621,201 A | * | 4/1997 | Langhans | G06Q 20/04 235/380 |
| 5,914,472 A | * | 6/1999 | Foladare | G06Q 20/04 235/380 |
| 7,966,235 B1 | * | 6/2011 | Capelli | G06Q 10/10 705/35 |
| 2007/0255662 A1 | * | 11/2007 | Tumminaro | G06Q 20/027 705/79 |

* cited by examiner

*Primary Examiner* — Bruce I Ebersman
*Assistant Examiner* — Mark H Gaw
(74) *Attorney, Agent, or Firm* — Haynes & Boone, LLP

(57) ABSTRACT

Methods and systems are provided for delegating spending from a user device, such as a parent's smart telephone, to another device, such as a child's smart telephone. In this manner, the owner of the other device, e.g., the child, can be allowed to purchase products. Restrictions can be placed upon the spending ability of the other device. For example, in order for the spending to be done, the other device can be required to be within a certain distance of the user device. Thus, purchases by the owner of the other device, e.g., the child, can be supervised.

16 Claims, 4 Drawing Sheets

SPENDING DELEGATION

BACKGROUND

Technical Field

The present disclosure generally relates to electronic commerce and, more particularly, relates to methods and systems for delegating spending authority from one device to another device.

Related Art

Credit cards, debit cards, and gift cards are well known. Such cards can be used to make purchases, such as at brick-and-mortar stores. Although such cards are very popular now, they are being replaced, at least in some instances, with mobile devices. For example, mobile devices such as smart telephones, tablet computers, and the like are being used in place of credit cards to make purchases.

A mobile device can contain information such as that stored on the magnetic strip of a credit card. The mobile device can be swiped or scanned, such as by imaging the screen of the mobile device or by wirelessly communicating with the wireless device via WiFi, Bluetooth, or near field communications (NFC). For example, the mobile device can be secured to a merchant's device reader to cause scanning of the mobile device during the checkout process.

Electronic tokens can similarly be used to make purchases. A hardware token is a dedicated device that can be used like the mobile device to make purchases. Thus, the hardware token can be secured to the merchant's device reader to cause scanning of the hardware token during the checkout process. Hardware tokens are typically small and can generally be attached to a key ring.

Software tokens are similar to hardware tokens, except that software tokens are stored in a non-dedicated device, such as a mobile device. Thus, a software token can be transferred to a user's smart telephone to enable the user's smart telephone to make purchases.

Although contemporary methods for making such purchases have proven generally satisfactory, such contemporary methods exhibit characteristics that generally detract from their overall utility and accuracy.

BRIEF DESCRIPTION OF THE DRAWINGS

The included drawings are for illustrative purposes and serve only to provide examples of possible systems and methods for the disclosed method and system for spending delegation. These drawings in no way limit any changes in form and detail that may be made to that which is disclosed by one skilled in the art without departing from the spirit and scope of this disclosure.

DETAILED DESCRIPTION

Figure 1:
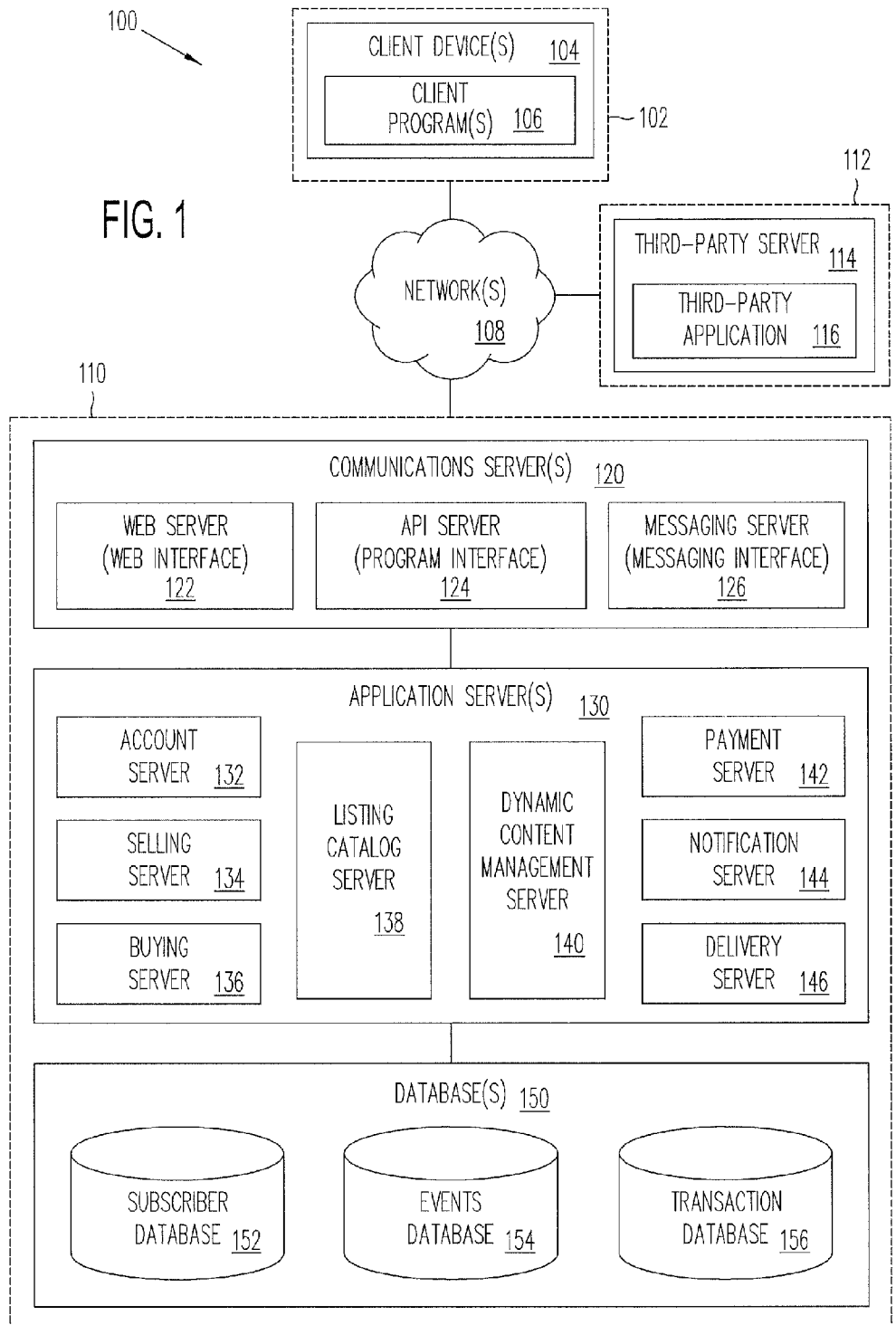
FIG. 1 is a block diagram of a computing system that is adapted for implementing one or more examples of processes involving activities with respect to spending delegation, according to an embodiment.

According to an embodiment, methods and systems can provide spending delegation from a user device, such as a parent's smart telephone, to another device, such as a child's smart telephone. In this manner, the owner of the other device, e.g., the child, can be allowed to purchase products. Such purchasing can be controlled, monitored, or supervised, as discussed herein.

Restrictions or limitations can be placed upon the spending ability of the other device. For example, the other device can be required to be within a certain distance of the user device, the ability of the other device to be used for purchasing products can be temporary, and/or only particular products or types of product can be purchased. In this manner, purchasing by the owner of the other device, e.g., the child, can be supervised, such as by the parent.

According to an embodiment, a system can comprise one or more memories that are configured to store information, such as information regarding an account of a user. One or more hardware processors can be in communication with the one or more memories. For example, the one or more hardware processors can be in communication with the one or more memories via a computer bus or communication network.

The one or more hardware processors can be operable to receive a communication that indicates that spending of a user device is to be delegated, such as from the user device to another device. That is, spending that can be performed with one device, e.g., the user device, can be transferred or delegated to another device, e.g., the other device. In this manner, the other device can then perform the spending that would otherwise have been performed with the user device. Thus, money can effectively be transferred from one device to another device. The transfer can be accomplished subject to restrictions, such as upon the use of the money, as disclosed herein.

The user device and/or the other device can be mobile devices, such as smart phones, tablet computers, and the like. The user device and/or the other device can be non-mobile or substantially stationary devices. The one or more memories and/or the one or more hardware processors can be one or more memories and/or one or more hardware processors of the user device, the other device, a server, or any other device or system.

The one or more hardware processors can be operable to access the information. The information can include a list of other devices (such as a list explicitly identifying the other devices) and/or a list of other people (such as a list implicitly identifying the other devices by identifying the owners of the other devices, e.g., people) to which the user device can delegate spending.

The information can further include a distance that the other device can be from the user device when using the delegated spending, one or more locations where the other device can be when using the delegated spending, one or more merchants with whom the other device can use the delegated spending, a time limit within which the other device can use the delegated spending, a predetermined money amount for the delegated spending, and one or more people who can use the delegated spending. The information can include any other limitations or restrictions.

The one or more hardware processors can be operable to determine, at least in part from the information, that the spending is delegatable to the other device. The one or more hardware processors can access the information in the one or more memories to determine if the other device or the owner of the other device is on the appropriate list and is thus approved (such as by the user) to have spending delegated thereto. The one or more hardware processors can be operable to delegate the spending to the other device, such as if the spending is delegatable to the other device, e.g., if the other device is on the list of other devices to which the user device can delegate spending.

Thus, determining that the spending is delegatable to the other device can comprise determining, at least in part from the information, that the other device is included in a list of other devices to which the user device can delegate spending. Delegating the spending to the other device can comprise delegating the spending to the other device only as long as the other device is within a predetermined distance from the user device. For example, the other device can be required to be within 10 feet, 25 feet, 50 feet, or 100 feet of the user device in order for the spending delegation to be effective, e.g., in order for the other device to be able to make purchases with the delegated spending. Imposing such a distance limit upon use of the other device to make purchases with the delegated spending can, for example, assure that a child is near a parent when such purchases are made. In this manner, purchases of a child or other person can be more closely supervised.

Delegating the spending to the other device can comprise delegating the spending to the other device only as long as the other device is at a predetermined location. The predetermined location can be a store, a shopping mall, a portion of a city, a city, a county, a state, a country, a geographic region, or any other location. Imposing such a location limit upon use of the other device to make purchases with the delegated spending can, for example, assure that the purchases are made by a legitimate recipient of the delegated spending. For example, in some instances it can be assumed that an attempt to make a purchase with the delegated spending is fraudulent if the purchase is being made in another state or country.

Delegating the spending to the other device can comprise delegating the spending to the other device only for use with a predetermined merchant. In this manner, the user can better control how the delegated spending is used. Such control may be appropriate when the spending is delegated to a child or employee, for example.

Delegating the spending to the other device can comprise delegating the spending to the other device only for predetermined products. In this manner, the user can better control how the delegated spending is used. Such control may be appropriate when the spending is delegated to a child or employee, for example.

Delegating the spending to the other device can comprise delegating the spending to the other device only for a predetermined amount of time. In this manner, the user can better control how the delegated spending is used. Further, the use of such a time limit can substantially mitigate the likelihood of fraud occurring. For example, a fraudster would have a limited time window within which to perpetrate the fraud.

Delegating the spending to the other device can comprise delegating the spending to the other device only for a predetermined money amount. In this manner, the user can better control how the delegated spending is used. For example, the delegated spending can be restricted to the purchase of items that cost less than the predetermined money amount. Further, the use of such a predetermined money amount can substantially mitigate the likelihood of fraud occurring. For example, a fraudster would have a limited money amount with which to perpetrate the fraud.

Delegating the spending to the other device can comprise delegating the spending to the other device only for use by a predetermined person. For example, the delegated spending can often only be used by a specified person, such as the user's child. Further, restricting the use of delegated spending a predetermined person can substantially mitigate the likelihood of fraud occurring.

Delegating the spending to the other device can comprise allowing the other device to delegate spending, e.g., sub-delegate. The user can determine whether other devices can delegate spending during a set up procedure for the system. The user can determine whether other devices can delegate spending for each instance of spending delegation. Thus, the user can determine whether other devices can delegate spending on a case-by-case basis.

Any or all of the restrictions can be defined, such as during a set up process for the system. Any or all of the restrictions can be predefined on a case-by-case basis. Any or all of the restrictions can be used together. Any desired combination of restrictions and limitations can be used.

The other device can be initially paired with the user device, such as by Bluetooth, NFC, or other communication means, such that the other device may be authorized to make purchases within desired restrictions of the user device or account. For example, the other device may be on a list of approved devices associated with the user account or user device. The other device may then be discoverable or recognized by the user device and/or the payment service provider.

Pairing the user device and the other device can be done by having the user device and the other device communicate with one another, such as in a manner that establishes a link, e.g., a temporary communications link, therebetween. The link can last for the duration of the spending delegation, e.g., until the delegated money amount has been spent, or just initially for authorization of the other device. The link can provide ongoing information from the user device to the other device and vice versa. For example, the link can provide location related information from the user device to the other device and vice versa. Breaking the link, such as by exceeding the range of communication (such as WiFi, Bluetooth, etc.) between the user device and the other device can suspend the spending delegation (such that the other device cannot spend the delegated money amount). Re-establishing the link can resume the suspended spending delegation. Thus, according to an embodiment, the other device can only spend the delegated money when the other device is near the user device.

For example, a parent and child can be together in a toy store. The parent can desire to allow the child to shop substantially autonomously, although with some supervision. The parent can delegate a predetermined amount of money, such as $40, to the child to spend while they are both at the toy store. It can be important to the parent that the child remains in the toy store. The delegated amount can only be good for shopping in the toy store and the parent can be notified, such as via the user device, if the child leaves the toy store. The notification can be a text message, vibration, visual alarm, and/or audio alarm. The delegated amount can be good for a predetermined amount of time, such as one hour.

The remaining time left for spending the delegated amount can be displayed on the parent's device and/or the child's device. An alarm can sound on the parent's device and/or the child's device as the time left for spending approaches the end, e.g. ten minutes prior to expiration of the one hour time limit.

Thus, the delegated amount can be used only as long as the parent is within a short distance of the child, such as within the same store (as determined by Bluetooth, GPS, the stores WiFi network, or any other means). Within these constraints (time, location, and money amount), the child can purchase any toy within the store. Other constrains, such as the type, name, or manufacturer of the toy, can also be applied.

The spending delegation can begin by the user selecting a payment provider or spending delegation app. The user can enter the money amount to be delegated, along with the desired restrictions (time, location, etc.). To effect the delegation, the parent can tap the parent's device against the child's device, for example. Both the parent's device and the child's device can indicate that the spending delegation has been successfully performed. The child can then make purchases with the child's device, subject to the restrictions, in the same manner that the parent would make purchases.

The spending delegation process can be initiated by the recipient of the spending delegation. For example, when the child and the parent are in the toy store and the child sees a toy that the child would like to purchase, then the child can initiate an app to request the appropriate money amount for the spending delegation. The child can, for example, use the child's device to scan or photograph the desired product, e.g., the toy. For example, the SKU, bar code, or QR code of the toy can be scanned. Such scanning or photographing can result in an identification and/or price of the toy being communicated to the parent's device so that the parent can use this information, at least in part, to decide whether or not to delegate the spending. The parent can be notified when purchases are made, when the delegated money amount has been entirely or substantially spent, and/or when the time limit for spending has expired or is about to expire. The parent can be notified of any other predetermined event, such as rapid movement or acceleration (as measured by sensors of the child's device) of the child indicating that the child is on an escalator, in an elevator, running, or on a moving sidewalk, for example. The parent can be notified of other events, such as changes of temperature, humidity, or the like.

The parent and/or the child can be notified of store or product related events, such as merchant incentives and approaching store closure time. The parent can receive audio and/or video from the child's device, such as audio and video of the child looking at toys and/or performing a purchase transaction.

The restrictions or limitations can change dynamically, such as depending upon the prior behaviors, habits, spending, and purchase history of the child. For example, if the child has frequently purchased video games within a particular series of video games and the child now wants to purchase the next video game in the series, but the cost of the next video game in the series is slightly more than the delegated spending money amount, then the delegated spending amount can be modified to facilitate this purchase since this purchase is consistent with the child's approved spending habits. In this manner, the system can allow purchases beyond those provided by the initial spending delegation, as long as desired criteria are fulfilled (such as consistency with previous spending habits) and as long as the increase in needed spending is below a predetermined amount.

Such an increase can be based upon prior approvals of modifications of the spending delegation money amount. For example, if the parent routinely approves a spending increase of $20, then a request for such a spending increase can be approved by the system without requiring approval of the parent (such as when the parent has preapproved such spending increases). In this manner, spending increases can be dynamically approved.

Thus, the child's device can first receive a pairing communication to facilitate spending delegation from the parent's device to the child's device. Then, the money amount and any restrictions on spending can be communicated from the parent device to the child's device. After the child makes a purchase, information regarding the purchase can be communicated from the child's device to the parent's device. During the pairing and/or spending delegation process, the parent account information or any other information can be accessed by the system to obtain and/or verify any money amount limits or other restrictions regarding the spending delegation. The transaction can be completed by the child using the child's device as though the transaction was being completed by the parent. The parent can receive a report, such as from the child's device and/or from a merchant device providing details of the completed transaction.

According to an embodiment, a method can comprise storing, such as in one or more memories, information regarding an account of a user. One or more hardware processors can be in communication with the one or more memories. The one or more hardware processors can receive a communication. The communication can indicate that spending of a user device is to be delegated to another device. The one or more hardware processors can access the information. The one or more hardware processors can determine, at least in part from the information, whether or not the spending is delegatable to the other device. If the spending is delegatable to the other device, the one or more hardware processors can delegate the spending to the other device.

According to an embodiment, a computer program product can comprise a non-transitory computer readable medium. The non-transitory computer readable medium can have computer readable and executable code for instructing one or more processors to perform any of the methods disclosed herein.

The one or more memories and one or more hardware processors can be part of the same device, e.g., server. The one or more memories and one or more hardware processors can be part of the different devices, e.g., servers. The one or more memories and one or more hardware processors can be co-located. The one or more memories and one or more hardware processors can be located in different places, e.g., different rooms, different buildings, different cities, or different states.

Exemplary applications of apparatuses and methods according to one or more embodiments are described in this section. These examples are being provided solely to add context and aid in the understanding of the embodiments. It will thus be apparent to one skilled in the art that the embodiments may be practiced without some or all of these specific details. In other instances, well known process steps have not been described in detail in order to avoid unnecessarily obscuring the disclosure. Other applications are possible, such that the following examples should not be taken as limiting.

In the following detailed description, references are made to the accompanying drawings, which form a part of the description and in which are shown, by way of illustration, various specific embodiments. Although these embodiments are described in sufficient detail to enable one skilled in the art to practice the embodiments, it is understood that these examples are not limiting, such that other embodiments may be used, and changes may be made without departing from the spirit and scope of the disclosure.

The disclosure relates, in the various described embodiments, to devices, systems and methods involving activities with respect to spending delegation. In various particular embodiments, the systems or methods can involve one or more user devices in communication over a network. Such a network can facilitate a streamlined process involving spending delegation.

A third party can be given spending delegation control. For example, a co-signer can be given spending delegation control. The co-signer can be a person who has agreed to be responsible for the spending of another person. Spending delegation control can provide the third party with an opportunity to veto, limit, or otherwise control spending delegation. For example, the third party can be notified of all or particular spending delegation (such as that for which the third party is a co-signer) and can be given the opportunity to halt or abort the spending delegation. The third party can be given the opportunity to reduce the spending delegation amount. Thus, a person who has an interest in spending can have some control over the spending, e.g., the ability to veto, limit, or otherwise control spending delegation. Such third party control can be a restriction regarding spending delegation.

Spending delegation can be performed dynamically. A communication method, such as push notification or a text message, can provide the parent with a request from a child for spending delegation. The request can be automatic, such as in response to the child scanning a product with a mobile device or in response to the child going through the check out process to purchase the product. In response to the request, the parent can approve, deny, or modify (e.g., limit), the spending request substantially in real time.

While the various examples disclosed herein focus on spending delegation, it will be understood that the various inventive principles and embodiments disclosed herein can be applied to other aspects of electronic commerce, as well.

Systems and Devices

Referring now to FIG. 1, an exemplary embodiment of a computing system adapted for implementing one or more processes involving spending delegation is illustrated in block diagram format. As shown, computing system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 can include, among various devices, servers, databases and other elements, a client 102 that may comprise or employ one or more client devices 104, such as a mobile computing device, a PC, and/or any other computing device having computing and/or communications capabilities in accordance with the described embodiments. Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. One or more of client programs 106 may display various graphical user interfaces (GUIs) to present information to and/or receive information from one or more of client devices 104.

As shown, client 102 can be communicatively coupled via one or more networks 108 to a network-based system 110. Network-based system 110 may be structured, arranged, and/or configured to allow client 102 to establish one or more communications sessions with network-based system 110 using various computing devices 104 and/or client programs 106. Accordingly, a communications session between client 102 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data and/or voice communications between client 102 and the network-based system 110 may be sent and received over one or more networks 108 such as the Internet, a WAN, a WWAN, a WLAN, a mobile telephone network, a landline telephone network, a VoIP network, as well as other suitable networks. For example, client 102 may communicate with network-based system 110 over the Internet or other suitable WAN by sending and or receiving information via interaction with a web site, e-mail, IM session, and/or video messaging session. Any of a wide variety of suitable communication types between client 102 and system 110 can take place, as will be readily appreciated.

In various embodiments, computing system 100 can include, among other elements, a third party 112, which may comprise or employ a third-party server 114 hosting a third-party application 116. In various implementations, third-party server 314 and/or third-party application 116 may host a web site associated with or employed by a third party 112. For example, third-party server 114 and/or third-party application 116 may enable network-based system 110 to provide client 102 with additional services and/or information, such as for spending delegation. In some embodiments, one or more of client programs 106 may be used to access network-based system 110 via third party 112. For example, client 102 may use a web client to access and/or receive content from network-based system 110 after initially communicating with a third-party web site 112.

Network-based system 110 may comprise one or more communications servers 120 to provide suitable interfaces that enable communication using various modes of communication and/or via one or more networks 108. Communications servers 120 can include a web server 122, an API server 124, and/or a messaging server 126 to provide interfaces to one or more application servers 130. Application servers 130 of network-based system 110 may be structured, arranged, and/or configured to provide various spending delegation and other services to users that access network-based system 110. In various embodiments, client 102 may communicate with applications servers 130 of network-based system 110 via one or more of a web interface provided by web server 122, a programmatic interface provided by API server 124, and/or a messaging interface provided by messaging server 126. It can be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 and/or third party 112 to the various services and functions provided by application servers 130.

When implemented for spending delegation, application servers 130 of network-based system 110 may provide various online marketplace and electronic commerce services including, for example, account services, buying services, selling services, listing catalog services, dynamic content management services, delivery services, payment services, and notification services. Application servers 130 may include an account server 132, a buying server 134, a selling server 136, a listing catalog server 138, a dynamic content management server 140, a payment server 142, a notification server 144, and/or a delivery server 146 structured and arranged to provide spending delegation.

Application servers 130, in turn, may be coupled to and capable of accessing one or more databases 150 including a subscriber database 152, an active events database 154, and/or a transaction database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
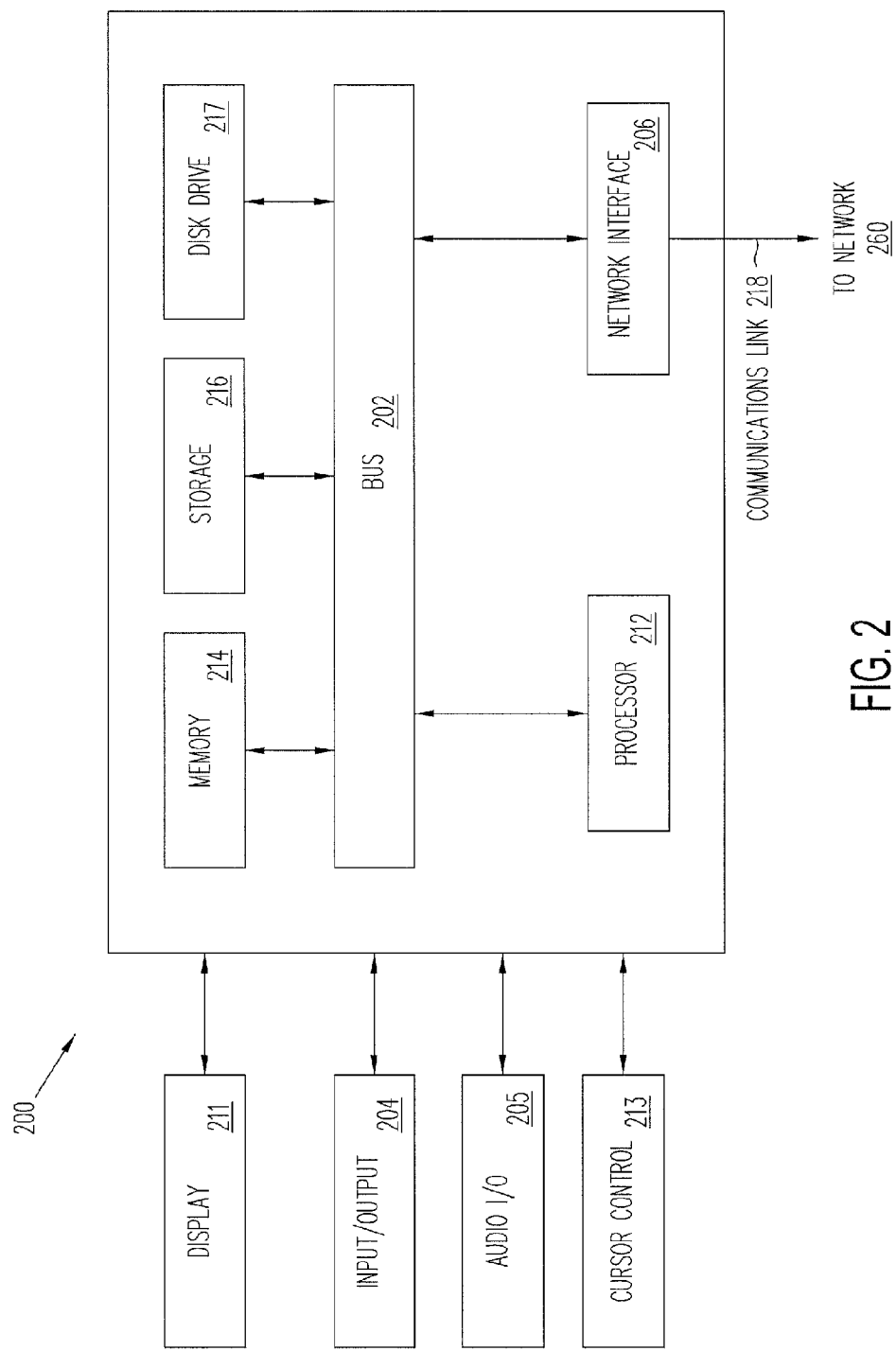
FIG. 2 is a block diagram of an example of a computer system suitable for implementing on one or more devices of the computing system in FIG. 1, according to an embodiment.

Continuing with FIG. 2, an exemplary computer system 200 suitable for implementing on one or more devices of the computing system in FIG. 1 is depicted in block diagram format. In various implementations, a device that includes computer system 200 may comprise a personal computing device (e.g., a smart phone, a computing tablet, a personal computer, laptop, PDA, Bluetooth device, key FOB, badge, etc.) that is capable of communicating with a network. The spending delegation system and/or a payment provider may utilize a network computing device (e.g., a network server) capable of communicating with the network. It should be appreciated that each of the devices utilized by users, the spending delegation system, and the payment providers may be implemented as computer system 200 in a manner as follows.

Computer system 200 can include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, or a payment provider server via a network. In an embodiment, the transmission is wireless, although other transmission mediums and methods may also be suitable. A processor 212, which can be a micro-controller, digital signal processor (DSP), or other hardware processing component, processes these various signals, such as for display on computer system 200 or transmission to other devices over a network 260 via a communication link 218. Processor 212 may also control transmission of information, such as cookies or IP addresses, to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In an embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments, execution of instruction sequences for practicing the embodiments may be performed by a computer system. In various other embodiments, a plurality of computer systems coupled by a communication link (e.g., LAN, WLAN, PTSN, or various other wired or wireless networks) may perform instruction sequences to practice the embodiments in coordination with one another. Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Spending Delegation

As will be readily appreciated, the foregoing networks, systems, devices, and numerous variations thereof can be used to implement methods and systems for spending delegation. Spending delegation can be performed substantially autonomously, such as between the user device and the other device. Spending delegation can be performed with the cooperation of a system or server, such as that of a merchant device (such as that of eBay of San, Jose, Calif.) or payment server (such as, for example, PayPal of San Jose, Calif.). The memories and/or processors can thus be memories and/or processors of the user device, the other device, and/or the server, for example.

As noted with respect to FIG. 2 above, a computer system 200 can include one or more processors 212 and one or more memories or storage devices 214, 216. Such a computer system 200 can be part of a user device, part of one or more servers on a network-based system, or some combination thereof. In particular, a given computing system can include a first memory device or storage component adapted to store information regarding one or more users of the system, as well as a second memory device or storage component adapted to store information regarding an online merchant.

In addition, one or more processors 212 can be adapted to facilitate spending delegation. Further functionality of the one or more processors 212 can include facilitating spending delegation.

Figure 3:
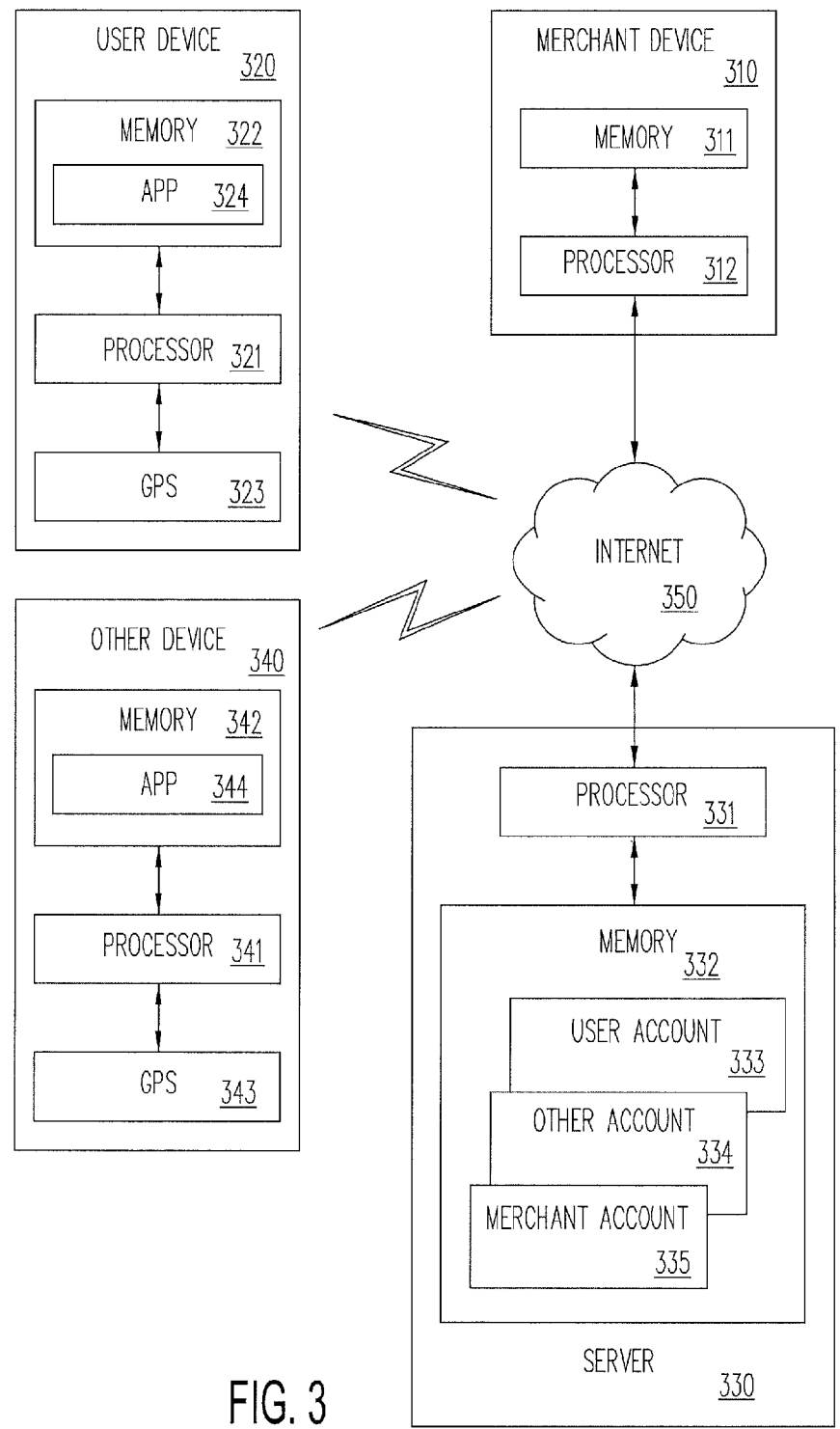
FIG. 3 is a block diagram of a system for spending delegation, according to an embodiment.

FIG. 3 is a block diagram of a system for spending delegation, according to an embodiment. The system can include a merchant device 310, a user device 320, another device 340, and/or a server 330. The functions and components discussed herein can be split and/or shared among the merchant device 310, the user device 320, the other device 340, the server 330, and/or any other devices or systems, as desired.

The merchant device 310 can comprise a merchant checkout terminal, a computer, and/or a server, for example. The merchant device 310 can be a merchant device of eBay, of San Jose, Calif., for example. The merchant device 310 can include a memory 311 and a processor 312. The merchant device 310 can be used for processing purchases from the merchant.

The merchant device 310 can be used for spending delegation. For example, the merchant device 310 can perform or facilitate the communications associated with spending delegation, such as the communications between the service provider and the other device to facilitate payment to the merchant using the other device.

The user device 320 can be carried by the user. The user device 320 can comprise a cellular telephone, a smart telephone, a hand held computer, a laptop computer, a notebook computer, or a tablet computer, for example. The user device 320 can include a processor 321, a memory 322, and a global positioning system (GPS) 323. The user device 320 can be used for routine telephone calls, text messaging, web browsing, and the like.

The user device 320 can be used for spending delegation. The user device 320 can be the device which provides spending delegation, e.g., which delegates spending, such as to the other device 340.

The user device 320 can be used for other aspects of spending delegation. For example, the user device 320 can perform or facilitate the communications associated with spending delegation, such as the communications requesting spending delegation, authorizing spending delegation, tracking use of spending delegation, reporting use of spending delegations (such as to the user and/or a payment provider), and the like.

The user device 320 can determine or facilitate determination of whether or not spending is delegatable to the other device 340. For example, the user device 320 can determine if the amount of spending delegation is proper, e.g., is less than or equal to an amount of spending that is authorized for the user device 320. The user device 320 can determine or facilitate determination of whether or not the user device 320 is authorized to provide spending delegation and/or whether or not the other device 340 is authorized to receive spending delegation. In one example, the user device 320 may be notified when the other device 340 is making a payment request and asked to approve or authorize the payment request.

An app 324 can be stored in the memory 322 and executed by the processor 321. The app 324 can be used for spending delegation. For example, the app 324 can perform or facilitate the communications associated with spending delegation, such as the communications requesting spending delegation, authorizing spending delegation, tracking use of spending delegation, reporting use of spending delegations (such as to the user and/or a payment provider), and the like.

The app 324 can determine or facilitate determination of whether or not spending is delegatable to the other device 340. For example, the user device 320 can determine if the amount of spending delegation is proper, e.g., is less than or equal to an amount of spending that is authorized for the user device 320. The app 324 can determine or facilitate determination of whether or not the user has authorized spending delegation to one or more specific other devices. GPS, WiFi, Bluetooth or any other means can be used to determine if the other device 340 is near the user device 320. According to an embodiment, spending delegation is only performed if the other device is near the user device (such as within a predetermined distance, within WiFi range, or within Bluetooth range).

The other device 340 can be different from, identical to, or similar to the user device 320. The other device 340 can be carried by the user. The other device 340 can comprise a cellular telephone, a smart telephone, a hand held computer, a laptop computer, a notebook computer, or a tablet computer, for example. The other device 340 can include a processor 341, a memory 342, and a global positioning system (GPS) 343. The other device 340 can be used for routine telephone calls, text messaging, web browsing, and the like.

The other device 340 can be used for spending delegation. The other device 340 can be the device which receives spending delegation. Thus, the other device 340 can receive money or authorization limits from the user device 320 and can generally spend the money in the same manner as, at least to some extent, the user device 320. However, restrictions or limitations can be put upon the used of the other device to spend the money, as discussed herein.

The other device 340 can be used for other aspects of spending delegation. For example, the merchant device can perform or facilitate the communications associated with spending delegation, such as the communications requesting spending delegation, authorizing spending delegation, tracking use of spending delegation, reporting use of spending delegations (such as to the user and/or a payment provider), and the like.

The GPS 343 of the other device 340 can be used to facilitate the use of geographic and/or location limitations with respect to the delegated spending of the other device 340. For example, the GPS 323 of the user device 310 can cooperate with the GPS 343 of the other device 340 to permit spending of the delegated money with the other device 340 only when the other device is within a predetermined distance with respect to the user device 310. As a further example, the GPS 343 can permit spending of the delegated money with the other device 340 only when the other device is within predetermined geographic bounds, e.g., at a specified location, store, shopping area, mall, city, state, region, or country.

The server 330 can comprise a server of a payment provider, such as Paypal, Inc. Thus, the server 330 can be a payment server. The server 330 can be a single server or can be a plurality of servers. The server 330 can include one or more processors 331 and one or more memories 332. The memory 332 can be a memory of the server 330 or a memory that is associated with the server 330. The memory 332 can be a distributed memory. The memory 332 can store a user account 333, another account 334, and/or a merchant account 334. The user account 333, the other account 334, and/or the merchant account 334 can store routine purchase information, such as credit or purchase limits, purchase histories, and the like.

The user account 333 can contain information regarding the user, such as information regarding the ability to delegate spending and/or restrictions or limitations associated therewith. The other account 334 can contain information regarding the owner of the other device 340, such as information regarding the ability to receive delegate spending and/or restrictions or limitations associated therewith. The merchant account 335 can contain information regarding customers of the merchant, such as information regarding the ability of the customers to provide and/or receive delegate spending and/or restrictions or limitations associated therewith.

The server 330 can be used for spending delegation. For example, the server 330 can perform or facilitate the communications associated with spending delegation, such as the communications requesting spending delegation, authorizing spending delegation, tracking use of spending delegation, reporting use of spending delegations (such as to the user and/or a payment provider), and the like.

The server 330 can determine or facilitate determination of whether or not spending is delegatable to the other device 340. For example, the server 330 can determine if the amount of spending delegation is proper, e.g., is less than or equal to an amount of spending that is authorized for the user device 320. The server 330 can determine or facilitate determination of whether or not the user has authorized spending delegation.

The server 330 can coordinate or control activities of the user device 320 and/or the other device 340. The server 330 can facilitate cooperation of the user device 320 with the other device 340 to provide spending delegation. The server 330 can determine or facilitate determination of whether or not the user device 320 is authorized to provide spending delegation and/or whether or not the other device 340 is authorized to receive spending delegation.

Generally, the merchant device 310, the user device 320, the other device 340, and the server 330 can perform functions discussed herein. That is, at least to some extent, a function that is discussed herein as being performed via a particular one of these devices can be performed by a different one of these devices, by a combination of these devices, and/or by other devices The merchant device 310, the user device 320, the other device 340, and the server 330 can communicate with one another via a network, such as the Internet 350. The merchant device 310, the user device 320, the other device 340, and the server 330 can communicate with one another via one or more networks, such as local area networks (LANs), wide area networks (WANs), cellular telephone networks, and the like. The merchant device 310, the user device 320, the other device 340, and the server 330 can communicate with one another, at least partially, via one or more near field communications (NFC) methods or other short range communications methods, such as infrared (IR), Bluetooth, WiFi, and WiMax.

For example, a parent and child are in a toy store. The parent wishes to delegate payment authority or spending to the child, e.g., from the user device 320 of the parent to the other device 340 of the child. The parent selects an option on the user device 320, such as via app 324, and proceeds to pair the user device 320 with the other device 340. The parent may then enter restrictions or limitations, such as manually, from a drop down, from preselected options, by voice, or in any other manner. Any default restrictions may be shown and/or modified.

The spending delegation can involve multiple rules or restrictions. For example, the child may be permitted to spend up to $5 for 10 minutes today. On another day in the same store, the child may be permitted to spend up to $50 for an hour. In such instances, default restrictions may not be suitable and custom or case-by-case restrictions can be defined by the user to suit the particular desires of the user and or to suit the particular circumstances at the time. Any desired restrictions and combinations of restrictions can be used.

Such custom restrictions may be defined before pairing or after. Once the user device 320 and the other device 340 are paired and the restrictions are set, the limitations and parent and child device information can be sent to the payment provider, e.g., the server 330. So, when the child device, e.g., the other device 340, makes a payment request, such as by scanning a product, the server 330 receives the payment request and matches the child device phone number or device ID with the parent account and delegation limitations and processes the purchase from the child device accordingly. That is, prior to authorizing the purchase, such as with the merchant, the server 330 can verify that the other device 340 has been given the spending delegation and that none of the restrictions are being violated.

Methods

Figure 4:
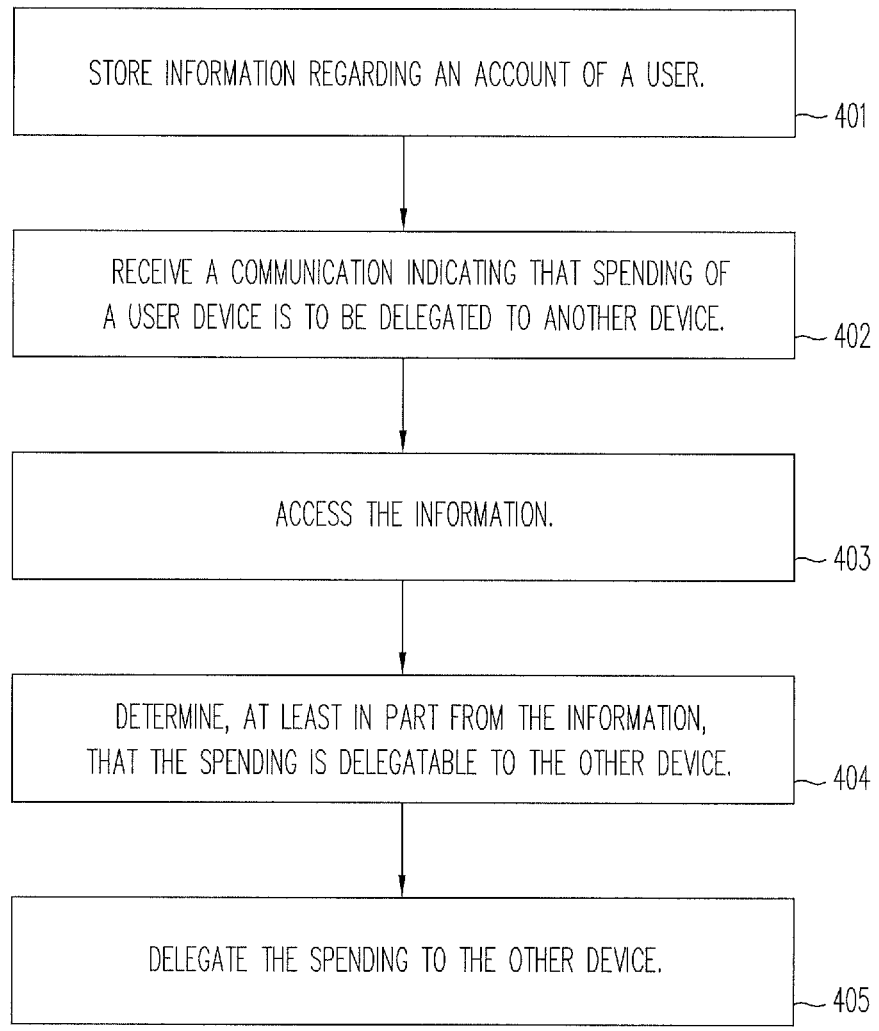
FIG. 4 is a flow chart of a method for spending delegation, according to an embodiment.

FIG. 4 is a flow chart that describes an example of operation of the spending delegation system according to embodiments thereof. Note that one or more of the steps described herein may be combined, omitted, or performed in a different order, as desired or appropriate.

Information can be stored, such as in one or more memories, as shown in step 401. The information can be information regarding an account of a user. For example, the information can include an amount of money that can be spent via the user device 320. The information can include an amount of money that can be delegated, such as from the user device 320 to the other device 340. The information can include any restrictions or limitations, such as with regard to how the other device 340 can spend the delegated money.

The spending delegation can be a gift, salary, payment for goods or services, proxy shopping (such as to facilitate having one person shop for another person or to facilitate having a person shop for a business), or any other type of payment. The spending delegation can be from a merchant or promoter to a person as an incentive to shop with a particular company or at a particular store. The spending delegation can be for any desired reason.

A communication can be received, such as by the user device 320, as shown in step 402. The communication can be received by the merchant device 310, the server 330, and/or any other device. The communication can indicate that spending of a user device is to be delegated to another device. The communication can indicate the money amount that is to be delegated to another device. The spending can be an initial amount or an increase over the initial amount was that previously delegated from the user device 320 to the other device 340.

The information can be accessed, as shown in step 403. For example, the account information stored in the one or more memories 322 of the user device 320 or stored in the one or more memories 332 of the server 330 can be accessed.

The accessed information can be used, at least in part, to determine whether or not the spending is delegatable, such as from the user device 320 to the other device 340, as shown in step 404. The information can be used, at least in part, to determine any limitations or restrictions that apply to the delegate and/or to spending by the device to which spending is delegated.

The spending can be delegated to the other device 340, as shown in step 405 and described herein. Either the user or another person can initiate the spending delegation process. The spending delegation process can be initiated from an app, such as the app 324 of the user device 320 or the app 344 of the other device 340. A spending delegation request can be communicated from the user device 320 or the other device 340 to the server 330 for processing by the server 330. The spending delegation, once approved by the server 330, can be sent to the other device 340 for use (for purchasing of products) and/or to the user device 320 for reporting purposes (to inform the user that the money amount has been delegated to the other device 340).

For example, a parent can start a spending delegation app of the user device 320 and can specify that a money amount, such as $40, is to be delegated to the other device 340 of a child that is with the parent while shopping. As a further example, the child can start a spending delegation app 344 of the other device 340, request a money amount such as $40, and the parent can subsequently approve the spending delegation. The spending delegation, once requested by the parent or requested by the child and approved by the parent can involve sending a communication to the server 330. The communication can include the money amount and identification of the other device 340, as sell as any restrictions provided by the user. The server 330 can verify that the spending delegation is permitted, such as by verifying that the money amount, e.g., the $40, and the recipient, e.g., the child, are permitted.

The server 330 can also apply any default restrictions, such as default restrictions related to the delegation of money from the parent to the child. For example, the server can apply time and/or distance restrictions. The money amount and the restrictions can be communicated from the server 330 to the other device 340 of the child to effect the spending delegation. Thus, the child can use the other device 340 to purchase products up to the delegated money amount during the time defined by the time restriction, as long as the child is near the parent per the distance restriction. When a purchase is made by the child using the other device 340, then the purchase can be communicated to the server 330, such as for processing regarding spending delegation and/or such as for processing the payment as a payment provider.

Such delegation can result from one or more communications between the user device 320, the other device 340, the merchant device 310, the server, 330, and/or any other device.

The person from whom spending is delegated, e.g., the owner of the user device 320, can be a boss, co-worker, parent, guardian, relative, or any other person. Spending can be delegated from a machine. For example, the user device 320 can be an autonomous machine from which spending is delegated. The user device 320 can be a machine, such as an autonomous machine, that manages spending.

The person to whom spending is delegated can be a child, employee, co-worker, relative, or any other person. Spending can be delegated to a machine. For example, the other device 340 can be an autonomous machine to which spending is delegated. The other device 340 can be an autonomous machine which performs shopping, such as for a person, company, or other entity (such as another machine). Thus, the discussion of spending delegation with respect to a parent/child relationship is by way of example only, and not by way of limitation.

The one or more memories and/or the one or more processors can be one or more memories and/or the one or more processors of the merchant device, 310, the user device 320, the server 330, and/or any other device or system. Memories and/or processors from any number of devices, systems, and entities can cooperate to perform the spending delegation method disclosed herein.

In implementation, at least some of the various embodiments may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, micro-controller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In an embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the embodiments.

Payment processing can be through known methods, such as transaction details being communicated to the payment provider through the app, the payment provider processing the details, which may include user account and identifier information and authentication, merchant information, and transaction details. The user account may be accessed to determine if any restrictions or limitations may prevent the transaction from being approved. If approved, the payment provider may send a notification to the merchant and/or the user. Thus, according to an embodiment, a spending delegation system can comprise one or more memories. The one or more memories can store information, such as information regarding an account of the user. The information can include account numbers, telephone numbers, account identifiers, device identifiers, account balances, spending limits, restrictions regarding delegated spending, and the like. Telephone numbers can be used as account and/or device identifiers. Account numbers can be used as device identifiers.

One or more hardware processors can be in communication with the one or more memories. The one or more hardware processors can be operable to receive a communication, such as a communication via a cellular network or via the Internet. The communication can indicate that the account of the user, which can be associated with an other device, is to be used for a payment, such as for a product that is to be purchased via the other device.

The account of the user can be associated with the other device, such as because the account of the user is associated with the user device and the user device is paired with the other device. The account of the user can be associated with any desired number of other devices.

The user device can be paired with the other device for spending delegation. Thus, the communication can indicate, provide, or facilitate a pairing between the user device and the other device. The pairing can be the result of linking the user device and the other device, as discussed herein. The communication can include an identifier for the account of the user and an identifier of the other device.

The one or more hardware processors can be operable to access the information regarding the account of the user based on the first communication. The one or more hardware processors can be operable to determine whether or not the other device is authorized for use with the account, e.g., is authorized to have spending delegated thereto.

The one or more hardware processors can be operable to determine whether or not there are limitations associated with the other device regarding payments made for purchases when using the account of the user. The limitations can be limitations regarding the use of delegated spending, as discussed herein.

The one or more hardware processors can be operable to process a payment request received from the other device. The payment request can be a payment request that uses the account of the user for payment. The payment request can be a request from the other device or from a merchant device that requests that payment be made for a product in order to facilitate purchase of the product via the other device using delegated spending provided by the user device.

The limitations can be associated with the other device and/or the limitations can be preset by the user. Thus, different sets of limitations can be preset for each different other device to which the user device can delegate spending. The limitations can be default limitations that are predefined for use with the other device. The limitations can be predefined by the user during a set up procedure for spending delegation.

The limitations can be associated with the other device and/or the limitations can be determined by the user for the pairing. Thus, the limitations can be defined by the user on a case-by-case basis. In this manner, limitations that are appropriate for the person to whom spending is delegated can better be provided. For example, different limitations can be provided for a user's child, brother, and employee.

The limitations can be associated with the other device and the limitations comprise a spending limit or a time limit. The limitations can be associated with the other device and the limitations can comprise both a spending limit and a time limit. Other limitations can similarly be applied to the other device.

Any desired combination of preset limitations and real-time, case-by-case limitations can be used. Preset limitations can be selectively modified to define real-time, case-by-case limitations. For example, a present time limit for delegated spending can be maintained while a preset money amount can be changed to better fit the specific circumstances of a particular spending delegation.

The identifier for the account of the user can comprise a phone number. The identifier for the account of the user can comprise any other identifying information. For example, the identifier for the account of the user can comprise a media access controller (MAC) address, an Internet Protocol (IP) address, a user name, a nickname (such as a user provided nickname), a password, a passphrase, or any other unique number or means of identifying the account of the user and/or the user device. The owner of the other device and/or the other devices can be similarly identified.

The processing can comprise determining whether or not the payment request satisfies the limitations. According to an embodiment, all of the limitations must be met before the system will authorize the purchase. According to an embodiment, only a portion of the limitations must be met before the system will authorize the purchase.

For example, the user can designate that some limitations are contingent limitations. Such contingent limitations can depend upon whether or not other limitations are met. Contingent limitations can be required to be met when other limitations are met. Contingent limitations can be required to be met when other limitations are not met.

Such contingent limitations can depend upon any other desired criteria, such as the time of day, day of the week, month, year, weather, location, owner of the other device, identification of the other device, or any other factor. For example, the owner of the other device can be permitted to purchase alcohol only after 6:00 PM on Friday and Saturday evening and only from a particular store. As a further example, the owner of the other device can be permitted to purchase gasoline only on odd days of the month, such as to limit driving of the owner of the other device.

A contingent limitation can be defined such that if the money amount of the purchase exceeds a predetermined amount, then only purchases of necessities, e.g., food and clothing are allowed. As a more particular example, the contingent limitation can require that for purchases over $50, the purchase can only be for food purchased at Stater Brothers grocery store or for clothing purchased at Walmart. Further according to this example, purchases for less than $50 can be for any products other than tobacco and alcohol.

A contingent limitation can require a money contribution from the owner of the other device. For example, a purchase can only be allowed if the owner of the other device contributes one half of the purchase price of the product being purchased.

A list of products that cannot be purchased via delegated spending can be included in the account information. A different list of products that cannot be purchased can be included for each separate other device to which spending can be delegated. The list can be modified, such as in real-time, by the user.

In a similar fashion, a list of products that can be purchased via delegated spending can be included in the account information. A different list of products that can be purchased can be included for each separate other device to which spending can be delegated. Again, the list can be modified, such as in real-time, by the user.

The one or more hardware processors can be further configured to send a second communication to the user device. The second communication can include a request to approve the payment request. The second communication can be in response to the other device being used in a purchase transaction. For example, the second communication can be in response to the other device being used to scan a bar code or QR code of a product that is being purchased via the other device.

The second communication can include a notification, such as to the user device and/or the other device, of approval or denial of the payment request. When the payment request has been approved, the notification can include the price of the product(s) purchased, any taxes, and any other money amounts (such as a delivery charge). When the payment request has been denied, the notification can include the reason for denial. The payment request can be denied because the product is subject to a product limitation, e.g., is not an authorized product or because the time for making purchases using the delegated spending has expired.

As used herein, the term "pair" can include linking two devices, such as two smart telephones, together. Pairing the two devices can comprise establishing and/or maintaining a communications link between the two devices. Pairing can be initiated by tapping the two devices together. Any desired type of communications can be used. Such pairing can, for example, facilitate communications between the two devices regarding a distance therebetween and/or regarding purchase transactions.

Pairing can result in unidirectional communication between the two devices. For example, pairing can result in communication only from the other device to the user device or vice versa.

Pairing can result in bidirectional communication between the two devices. For example, pairing can result in communication from the other device to the user device and from the user device to the other device.

Pairing can result in communication between more than two devices. For example, pairing can result in communication between the other device, the user device, and the server. Thus, the server can monitor and/or control the pairing, the spending delegation process, and/or purchase transactions made by the other device.

Pairing can be done between two devices under the supervision, control, and/or monitoring of a third device. For example, a child can pair a user device of the child with the other device of another child. A parent can use a parent device to monitor and control the pairing and any subsequent purchase transactions. The parent can thus inhibit the pairing and/or inhibit any purchases made by the other child.

One user device can pair with multiple other devices. Thus, one user device can delegate spending to a plurality of other device. Such pairing and spending delegation to a plurality of other device can occur generally simultaneously, e.g., to all of the other devices at substantially the same time. Such pairing and spending delegation to a plurality of other device can occur sequentially, e.g., to each of the other devices at substantially different times. The use of such multiple pairings and spending delegations can facilitate spending delegation from a parent to a plurality of children, for example. As a further example, the use of such multiple pairings and spending delegations can facilitate spending delegation from an employer to a plurality of employees.

As used herein, the term "store" can include any business or place of business. The store can be a brick and mortar store or an online store. Delegated spending can be used for either brick-and-mortar store purchases or online purchases. Examples of stores can include supermarkets, discount stores, book stores, convenience stores, restaurants, gas stations, auto repair shops, and movie theaters. The store can be any person or entity that sells a product and/or provides a service.

As used herein, the term "product" can include any item or service. Thus, the term "product" can refer to physical products, digital goods, services, or anything for which a user can make a payment, including charitable donations. A product can be anything that can be sold. Examples of products include cellular telephones, concerts, meals, hotel rooms, automotive repair, haircuts, digital music, and books. The product can be a single item or a plurality of items. For example, the product can be a tube of toothpaste, a box of laundry detergent, three shirts, and a donut. Products can be purchased from brick-and-mortar stores or from online stores.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "network" can include one or more local area networks (LANs) such as business networks, one or more wide area networks (WANs) such as the Internet, one or more cellular telephone networks, or any other type or combination of electronic or optical networks.

As used herein, the term "card" can refer to any card or other device that can be used to make a purchase in place of cash. For example, the card can be a bank card, credit card, debit card, gift card, or other device. The card can be a token, such as a hardware token or a software token. The card can be stored in and/or displayed upon a user device, such as a cellular telephone.

The foregoing disclosure is not intended to limit the disclosure to the precise forms or particular fields of use disclosed. It is contemplated that various alternate embodiments and/or modifications, whether explicitly described or implied herein, are possible in light of the disclosure. Having thus described various example embodiments of the disclosure, persons of ordinary skill in the art will recognize that changes may be made in form and detail without departing from the scope of the disclosure. Thus, the disclosure is limited only by the claims.

What is claimed is:

1. A system comprising:
   a non-transitory memory; and
   one or more hardware processors coupled to the non-transitory memory, the one or more hardware processors configured to execute instructions to cause the system to perform operations comprising:
   utilizing an application programming interface to communicate with a first user device and detect that the first user device is currently involved in an execution of an electronic purchase of a product, the first user device associated with a first user;
   in response to the detecting that the first user device is currently involved in the execution of the electronic purchase:
   accessing, in real time, a database to: identify an account of a second user and determine one or more limitations for utilization of the account by the first user device, wherein the identifying the account of the second user includes utilizing an identifier that corresponds to the account of the second user to identify the account of the second user from a plurality of accounts in the database;
   in response to determining that the electronic purchase of the product by the first user device satisfies the one or more limitations, analyzing information received from the first user device or a second user device to determine the first user device is paired with the second user device associated with the second user and determine the first user device is within a predetermined distance from the second user device based on detecting a short-range wireless communication link between the first user device and the second user device is active, wherein the determining the electronic purchase of the product by the first user device satisfies the one or more limitations includes determining whether an amount associated with the electronic purchase exceeds a threshold amount; and
   in response to determining: (i) the electronic purchase satisfies the one or more limitations, (ii) the first user device is paired with the second user device, and (iii) the first user is within the predetermined distance from the second user device, automatically processing the electronic purchase using the account of the second user.

2. The system of claim 1, wherein at least one of the one or more limitations is preset by the second user.

3. The system of claim 1, wherein the one or more limitations comprise a spending limit, a time limit, or both.

4. The system of claim 1, wherein the operations further comprise transmitting a notification of approval of the electronic purchase to the second user device.

5. The system of claim 1, wherein the short-range wireless communication link comprises a Bluetooth communication link, a near field communication (NFC) link, or a Wi-Fi communication link.

6. The system of claim 1, wherein the determining the electronic purchase of the product by the first user device satisfies the one or more limitations includes determining that a merchant associated with the electronic purchase corresponds to a merchant associated with the utilization of the account of the second user.

7. A method comprising:
   utilizing an application programming interface to communicate with a first user device and detect a payment request, corresponding to the first user device, for an electronic purchase of a product, the first user device associated with a first user;
   in response to the detecting the payment request:
   accessing, in real time, a database to: identify an account of a second user and determine one or more limitations for utilization of the account by the first user device, wherein the identifying the account of the second user includes utilizing an identifier that corresponds to the account of the second user to identify the account of the second user from a plurality of accounts in the database;
   in response to determining that the electronic purchase of the product by the first user device satisfies the one or more limitations, analyzing information received from the first user device or a second device to determine the first user device is paired with the second user device associated with the second user and determine the first user device is within a predetermined distance from the second user device based on detecting a short-range wireless communication link between the first user device and the second user device is active, wherein the determining the electronic purchase of the product by the first user device satisfies the one or more limitations includes determining whether an amount associated with the electronic purchase exceeds a threshold amount; and
   in response to determining: (i) the electronic purchase satisfies the one or more limitations, (ii) the first user device is paired with the second user device, and (iii) the first user device is within the predetermined distance from the second user device, automatically processing the payment request using the account of the second user.

8. The method of claim 7, wherein at least one of the one or more limitations is preset by the second user.

9. The method of claim 7, wherein the one or more limitations comprise a spending limit, a time limit, or both.

10. The method of claim 7, further comprising transmitting a notification of approval of the payment request to the second user device.

11. The method of claim 7, wherein the short-range wireless communication link comprises a Bluetooth communication link, a near field communication (NFC) link, or a Wi-Fi communication link.

12. The method of claim 7, wherein the determining the electronic purchase of the product by the first user device satisfies the one or more limitations includes determining that a merchant associated with the electronic purchase corresponds to a merchant associated with the utilization of the account of the second user.

13. A non-transitory machine-readable medium having stored thereon machine-readable instructions executable to cause a machine to perform operations comprising:

utilizing an application programming interface to communicate with a first user device and detect a payment request, corresponding to the first user device, for an electronic purchase of a product, the first user device associated with a first user;

in response to the detecting the payment request:

accessing, in real time, a database to: identify an account of a second user, and determine one or more limitations for utilization of the account by the first user device, wherein the identifying the account of the second user includes utilizing an identifier that corresponds to the account of the second user to identify the account of the second user from a plurality of accounts in the database;

in response to determining that the electronic purchase of the product by the first user device satisfies the one or more limitations, analyzing information received from the first user device or a second device to determine the first user device is paired with the second user device associated with the second user and determine the first user device is within a predetermined distance from the second user device based on detecting a short-range wireless communication link between the first user device and the second user device is active, wherein the determining the electronic purchase of the product by the first user device satisfies the one or more limitations includes determining whether an amount associated with the electronic purchase exceeds a threshold amount; and in response to determining: (i) the electronic purchase satisfies the one or more limitations, (ii) the first user device is paired with the second user device, and (iii) the first user device is within the predetermined distance from the second user device, automatically processing the payment request using the account of the second user.

14. The non-transitory machine-readable medium of claim 13, wherein the one or more limitations associated with the first user device comprise a limitation preset by the second user.

15. The non-transitory machine-readable medium of claim 13, wherein the short-range wireless communication link comprises a Bluetooth communication link, a near field communication (NFC) link, or a Wi-Fi communication link.

16. The non-transitory machine-readable medium of claim 13, wherein the determining the electronic purchase of the product by the first user device satisfies the one or more limitations includes determining that a merchant associated with the electronic purchase corresponds to a merchant associated with the utilization of the account of the second user.

* * * * *